ATTACHMENT OF CUTTING ELEMENTS TO WEAR RESISTANT BLADES
Filed Sept. 26, 1960 2 Sheets-Sheet 1
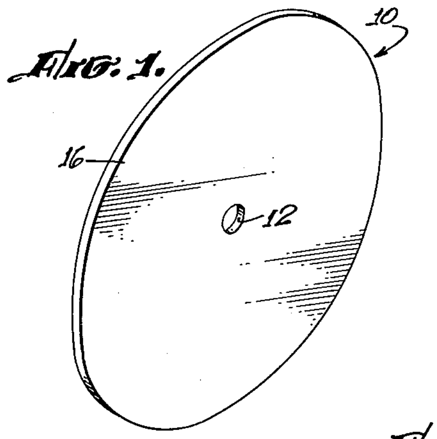
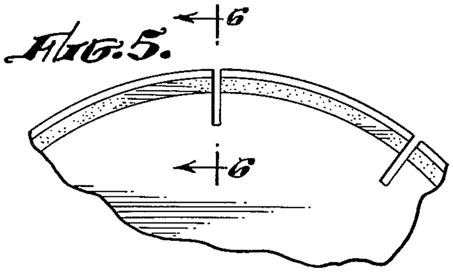
FIG. 6.
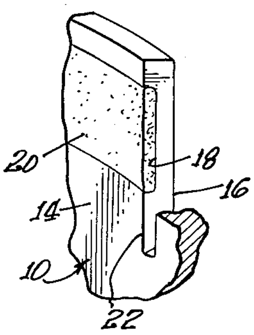
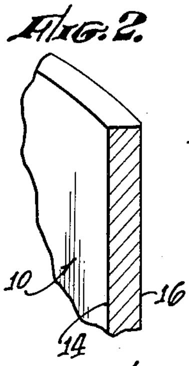
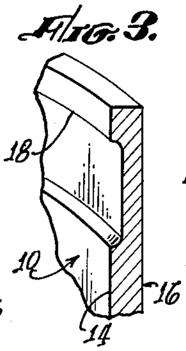
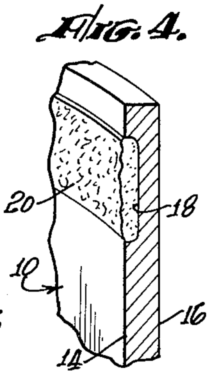
FIG. 7. FIG. 10.
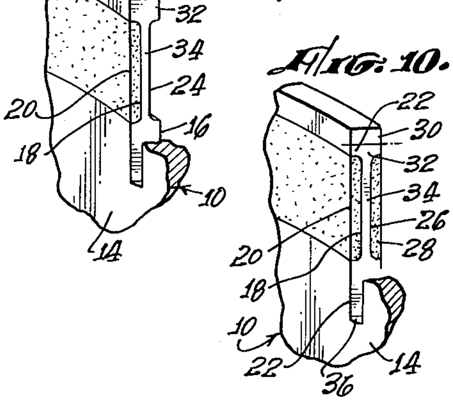
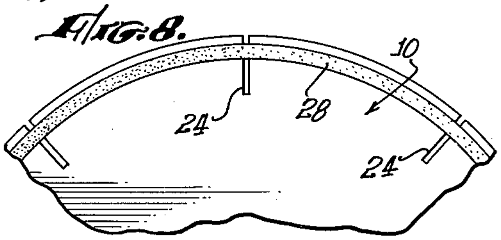
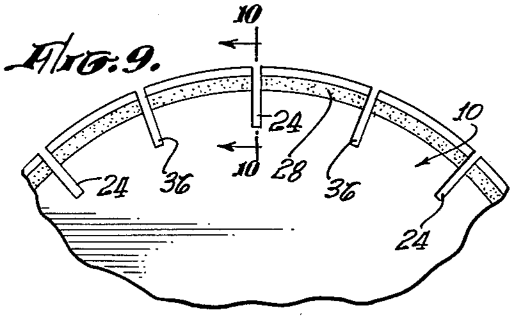
GEORGE O. GRIFFIN,
ELLSWORTH S. HANSHAW,
INVENTORS.
BY
Boniard I. Brown
ATTORNEY.

Aug. 7, 1962 G. O. GRIFFIN ET AL 3,048,160

ATTACHMENT OF CUTTING ELEMENTS TO WEAR RESISTANT BLADES

Filed Sept. 26, 1960 2 Sheets-Sheet 2

GEORGE O. GRIFFIN,
ELLSWORTH S. HANSHAW,
INVENTORS.

BY
Boniard I. Brown
ATTORNEY.

United States Patent Office 3,048,160

Patented Aug. 7, 1962

3,048,160

ATTACHMENT OF CUTTING ELEMENTS TO WEAR RESISTANT BLADES

George O. Griffin, Newport Beach, and Ellsworth S. Hanshaw, Baldwin Park, Calif., assignors to Trurun, Inc., Huntington Beach, Calif.

Filed Sept. 26, 1960, Ser. No. 58,252

15 Claims. (Cl. 125—15)

The present invention relates generally to blades for cutting hard materials; more particularly, the invention relates to improvements in the fabrication of cutting blades having abrasive cutting edges and wear resistant sides.

Blades for cutting or sawing hard materials, such as concrete or rock, generally utilize abrasive cutting elements or segments attached to blade cores. Abrasive elements are conventionally brazed to the cores, because it has been relatively impracticable to secure them by welding or other means. An important problem associated with such blades is blade failure caused by excessive wear or undercutting of blade sides before the abrasive cutting elements have fulfilled their service life expectancy. To eliminate excessive wear and erosion, wear-resistant bodies or materials have been provided at core sides. These may be special inserts or they may be materials or bodies otherwise secured at the core sides. A highly advantageous method of providing wear resistant bodies of material at core sides is described and claimed in the copending application of George O. Griffin and Ellsworth S. Hanshaw, Serial No. 14,593, filed March 14, 1960. According to that method, wear resistant materials are welded in grooves in the sides of a blade core near the periphery at the areas where excessive wear and erosion normally occur.

The present invention provides improvement in the fabrication of cutting blades having abrasive cutting edges and wear resistant sides. Abrasive cutting elements or segments are welded, preferably by an electrical resistance welding process, to a peripheral rim portion of the core which is disposed outwardly of the wear resistant bodies or materials at the core sides. Preferably, a projection welding process of resistance welding is utilized, and appropriate projections are provided on the cutting elements or on the core rim portion. Each cutting segment is positioned adjacent to the core rim portion and electrical current is passed through the segment and the rim portion, while pressure is applied to urge the segment and the rim portion together. The projections serve to concentrate heat and pressure at particular points. The steel or material of the core rim portion becomes plastic or fluid, and the segment projections penetrate into and displace the rim material, thereby causing the rim material to flow into and fill the spaces between the segment projections. The segment projections penetrate into the core rim portion to a depth which varies in accordance with the pressure applied. Because it is desirable that the abrasive segments be close to the wear resistant materials at the core sides, the segment projections preferably penetrate into or imbed themselves in the wear resistant materials. A blade core is therefore provided which has wear-resistant bodies or materials at its sides, a peripheral rim portion disposed outwardly of the wear-resistant materials, and abrasive cutting elements welded to the core rim portion. The cutting elements are positioned in close proximity to the wear resistant materials. The cutting segments are very effectively secured to the core because of the very effective fusion achieved by the electrical resistance welding process, and because the projections themselves provide increased weldable area. The projections provide a high degree of strength or resistance to tangential loads in service, because they are radially imbedded in the core.

The method of attaching cutting elements according to the present invention is particularly advantageous in combination with the method described and claimed in the above-identified copending application, which method provides wear-resistant materials on the core sides by welding hard facing materials into grooves. The combination of the method provides a highly practicable and efficient method of producing superior wear resistant cutting blades. By the method of the copending application, a groove or depression is cut into each side of a blade core near the periphery, thereby defining a rim portion. Wear resistant hard facing material is welded into each of the grooves in succession. In accordance with the present invention, abrasive cutting elements are welded to the core rim portion in the manner outlined above and described hereinafter.

The present invention provides a practical, efficient method of fabricating superior wear resistant blades, by providing a method of welding cutting segments to cores which overcomes problems which have rendered the welding of cutting elements to cores relatively impracticable. Blades are provided which are superior to blades fabricated by conventional techniques of brazing segments to cores. The method requires only that two dissimilar materials be welded together, the materials of the cutting segment and the core rim. It therefore obviates the difficulties which are presented in attempting to weld three or four dissimilar metal alloys or materials simultaneously, as when diamond abrasive segments must be welded to a core and to wear resistant hard facing materials. The nature of metal alloys utilized in abrasive segments, wear resistant materials and blade cores have made the mutual welding thereof a highly critical operation. Such alloys are relatively poor conductors of heat. Relatively small variations in the compositions of alloys cause wide variations in their welding characteristics.

It is therefore an object of the present invention to provide a new and improved method of fabricating cutting blades having abrasive cutting edges and wear resistant sides.

An object of the invention is the provision of a practical, efficient method of securing cutting elements to wear-resistant blade cores.

It is an object of the invention to provide a method of fabricating abrasive cutting blades wherein improved weldability of cutting elements to a core is facilitated by the provision of a core rim portion disposed outwardly of wear resistant materials at the core sides.

An object of this invention is to provide a method of fabricating an abrasive cutting blade according to the foregoing object wherein cutting segments are secured by a process of electrical resistance welding under pressure.

It is an object of the present invention to provide a method according to the foregoing object wherein projections on the cutting segments or on the core rim portion concentrate heat and pressure to facilitate fusion and the penetration of the rim material by the segments.

An object of this invention is the provision of a method according to the foregoing object, wherein the cutting segment projections penetrate the core rim portion and contact the wear resistant materials.

It is an object of the invention to provide an abrasive cutting blade by cutting grooves in blade core sides inwardly from a core rim portion, welding wear-resistant hard facing material in each of the grooves, and securing abrasive cutting elements to the core rim portion by electrical resistance welding.

An object of the present invention is to provide a method of fabricating abrasive cutting blades wherein cutting segments are welded in close proximity to wear resistant bodies or materials at the core sides.

Other objects, features and advantages of the present invention will become apparent to those versed in the art from a consideration of the following description, the appended claims and the accompanying drawings, wherein:

FIGURE 1 is a perspective view of a blank for an abrasive cutting blade core utilized in the method of the present invention;

FIGURE 2 is a fragmentary sectional and perspective view taken at line 2—2 of FIGURE 1;

FIGURE 3 is a fragmentary sectional and perspective view similar to that of FIGURE 2 and showing an annular groove or depression cut near the periphery of the blade core of FIGURE 1;

FIGURE 4 is a view similar to that of FIGURE 3, showing wear resistant hard facing material welded in the groove in the core;

FIGURE 5 is a partial elevational view showing radial slots cut inwardly from the periphery of the core;

FIGURE 6 is a fragmentary sectional and perspective view taken at line 6—6 of FIGURE 5, showing the core after removal of excess hard facing material;

FIGURE 7 is a fragmentary sectional view similar to that of FIGURE 6, showing the core with a second annular groove cut in the side of the core opposite from the groove shown in FIGURE 3;

FIGURE 8 is a partial elevational view, showing the slotted core with hard facing material welded in the groove shown in FIGURE 7;

FIGURE 9 is a partial elevational view showing the core with additional radial slots cut therein;

FIGURE 10 is a fragmentary sectional and perspective view taken at line 10—10 of FIGURE 9, showing the core after the removal of excessive hard facing material;

Figures 11, 12, 13, 14, 15, 16, 17, 18, 19, 20:
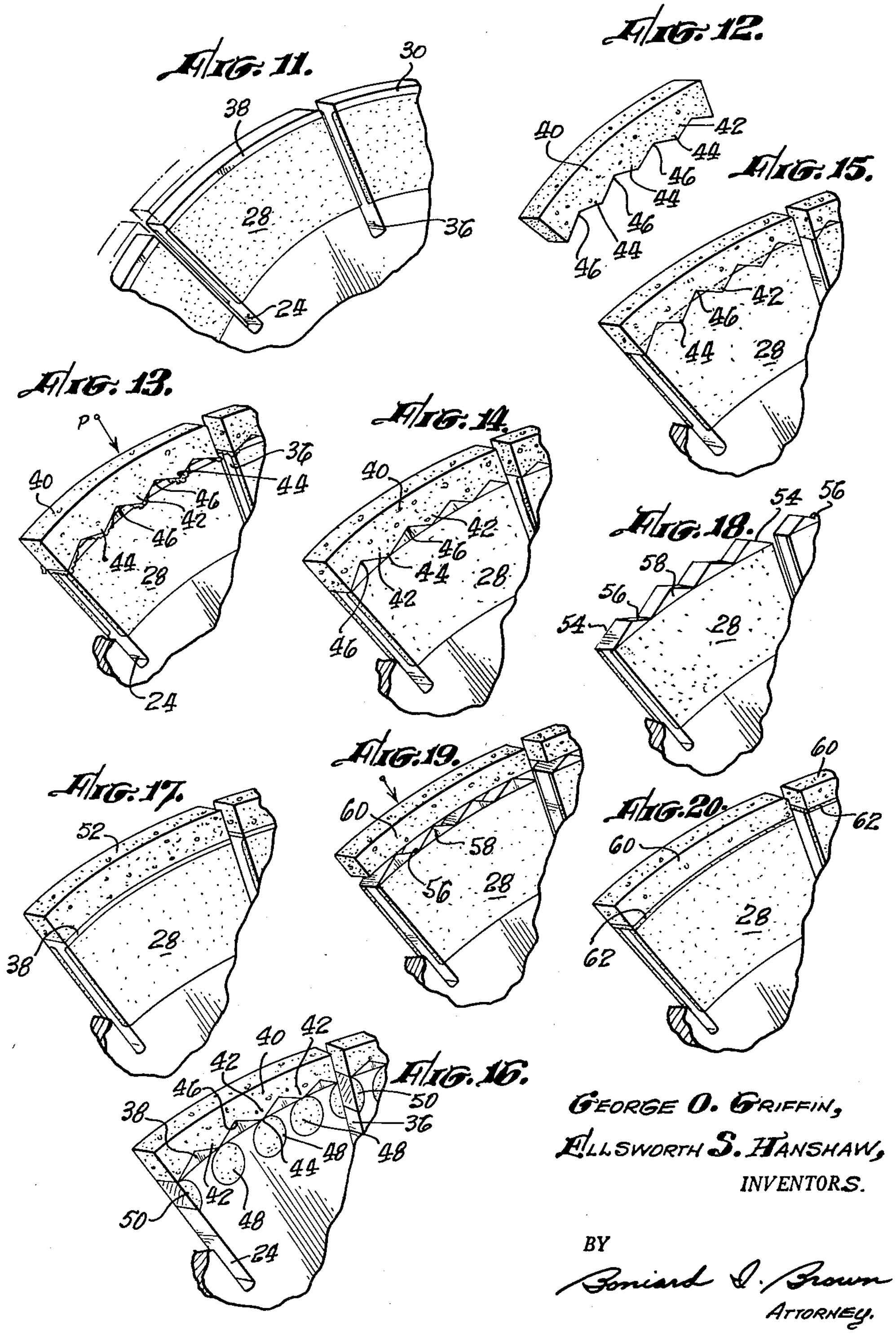
FIGURE 11 is a partial perspective view showing the core with a part of the rim portion removed.
FIGURE 12 is a perspective view of a preferred form of abrasive cutting segment utilized with the present invention.
FIGURE 13 is a partial perspective view showing the cutting segment of FIGURE 12 and the core during welding.
FIGURE 14 is a partial perspective view showing cutting segments welded to the core of FIGURE 10 to provide a cutting blade according to the invention.
FIGURE 15 is a partial perspective view showing a modified form of cutting blade with cutting segments imbedded in the hard facing materials at the core sides.
FIGURE 16 is a partial perspective view showing a modified form of cutting blade wherein cutting segment projections are imbedded in the core rim and contact spots of wear resistant material at the core sides.
FIGURE 17 is a partial perspective view illustrating another form of cutting blade according to the invention.
FIGURE 18 is a partial perspective view of a core with projections or teeth defined in its peripheral rim portion.
FIGURE 19 is a partial perspective view showing the core of FIGURE 18 with a cutting segment positioned adjacent thereto.
FIGURE 20 is a partial perspective view showing the core and segment of FIGURE 19 welded together to form an abrasive cutting blade.

Referring to the drawings, FIGURES 1 through 14 illustrate a preferred embodiment of the method of the present invention for fabricating a cutting blade with abrasive cutting elements and with wear resistant sides. FIGURES 1 through 10 illustrate a preferred method of providing wear-resistant bodies or materials at the core sides, this method being described and claimed in the above-identified copending application. FIGURES 11 through 14 illustrate a preferred method of welding abrasive cutting elements to a core.

In FIGURES 1 and 2 there is shown a circular steel core blank 10 having a central opening 12 and side surfaces 14, 16. The core is preferably formed of a steel which is heat treatable to a desired hardness, such as a hardness of Rockwell C 30–35.

In accordance with the method of the copending application, an annular depression or groove is first cut in side 14 of the core blank near the periphery, as shown in FIGURE 3. A body of wear resistant hard facing material 20 is welded in the groove 14, as indicated in FIGURE 4, and annular rim section 22 defined by the groove retaining the facing material while it is molten. The hard facing material 20 may be a tungsten-cobalt base alloy having a melting point of approximately 2600° Fahrenheit. The core blank is preferably allowed to cool slowly to prevent cracking of the hard facing material, by placing the core blank in an insulating material such as vermiculite, or by cooling in a furnace, or by other means. The blank may preferably be permitted to cool from a temperature of 1200°–1500° Fahrenheit to room temperature in approximately eight hours.

As shown in FIGURES 5 and 6, radial slots 24 are cut inwardly from the periphery of the core blank. The slots are dimensioned in accordance with the size of the core. For example, each slot might be one-sixteenth inch wide and three-quarters inch deep, with the slots spaced at three inch intervals. The purpose of cutting the slots or "gumming" the core is to permit expansion and contraction during the fabrication and the service life of the core without cracking of the welded hard facing material.

Excess hard facing material is then removed, as by grinding, to provide a wear-resistant surface which is co-planar with side surface 14 of the core blank, as shown in FIGURE 6, or a surface which is displaced outwardly a few thousandths of an inch (not shown).

Next, a second annular depression or groove 26 is cut in the side surface 16 of the core, as indicated in FIGURE 7. A second body of hard facing material 28 is welded in the second groove 26, as shown in FIGURE 8. An annular rim section 30 defined by the groove retains the material 28 while it is fluid. The second facing material is preferably an alloy having a lower melting point than the hard facing material 20 on the opposite side of the core, in order to permit the welding of the material 28 without requiring such a degree of heat that fusion or sagging of the hard facing material 20 on the opposite side might occur. By way of example and not by way of limitation, with a tungsten-cobalt base alloy 20 welded in groove 18, a chromium-borite-nickel alloy having a melting point of approximately 1400° Fahrenheit might be welded in the groove 24.

After the welding of the hard facing material 28 in groove 26, the blade core is again slowly cooled in the manner hereinbefore described.

As shown in FIGURE 10, the grooves or depressions 18, 26 define a peripheral rim portion 32 (comprised of rim sections 22, 30) and a reduced core portion 34.

Radial slots 36 are then cut inwardly from the periphery of the blade core, each slot 36 being spaced between each pair of adjacent slots 24, as shown in FIGURE 9. The slots 36 are wider than the original slots 24. Each slot 24 is then cut to the greater width of the slots 36, to provide slots of the same size equally spaced about the circular periphery of the blade core.

Excess material is removed from the body of hard facing material 28 to provide a wear-resistant surface which is either co-planar with the side surface 16 or is displaced outwardly a few thousandths of an inch.

The core is then heat-treated to provide a desired hardness. For example a hardness of Rockwell C 30–35 may be provided by quenching in a bath at 1600° Fahrenheit. The core is preferably subjected to a tempering operation.

Part of the annular peripheral rim portion is removed, as by grinding, to define a relatively thin core rim portion 38. Rim portion 38 may preferably have a thickness of between 0.010 and 0.25 inch, a typical margin thickness being 0.040 inch.

FIGURE 12 illustrates a preferred type of diamond abrasive cutting segment 40 for use with the present invention. Projections 42 in the form of teeth, each having a crest 44 and a root 46, are defined by serration of the inner side of the segment. Diamond abrasive cutting segments are conventionally produced by powdered metallurgy processes which involve the placing of diamonds in a matrix, such as a tungsten carbide matrix, and sintering with heat and pressure. Appropriate methods of forming such segments are set forth in U.S. Patents Nos. 1,895,926 and 1,904,049

An important feature of the present invention is that the abrasive cutting segments are secured to the core by welding the peripheral rim portion 38, preferably by electrical resistance welding. Projection resistance welding is preferred, although other welding techniques may be utilized, such as the electrical resistance welding processes of flash welding or spot welding, hereinafter discussed.

As is well known in the art, electrical resistance welding effects coalescence of the parts being welded by means of the heat produced by resistance to electric current flowing through the parts. Pressure is preferably applied to urge the parts together, in order to facilitate fusion and mutual penetration. In projection resistance welding, projections on a part serve to concentrate current, heat and pressure at particular points, thereby causing localized fusion and penetration of the projections into the other part being welded.

In accordance with the present invention, welding is effected essentially between the abrasive cutting segments and the rim portion 38 of the blade core. The projections or teeth 42 serve a functional purpose in concentrating heat and pressure in the manner mentioned above.

Radial pressure is preferably applied between the abrasive cutting segment and the core rim portion during the welding process, as indicated by the arrow in FIGURE 13. Steel of the rim portion melts or fuses, typically at a welding temperature of 2600° to 2750° Fahrenheit. The segment projections concentrate at particular points the pressure and the heat produced by electrical resistance, thereby greatly facilitating the melting of the core rim portion and the penetration thereof by the segment. The projections displace the plastic or fluid rim portion material, which flows into and fills the spaces defined between the projection roots 46, the abrasive segment, and the projections. Part of the core rim material flashes laterally outward, as indicated in FIGURE 13. The radial pressure causes the crests 44 of the segment teeth to penetrate the rim portion 38 and move inward toward the hard facing materials 20, 28. It will be readily understood that the configuration of a finished abrasive cutting blade can be varied by varying the radial pressure between the cutting segments and the blade core during the welding process. Preferably, sufficient pressure is applied to cause the crests 44 of the segment projections to penetrate through the margin 38 and contact the peripheries of the hard facing material bodies 20, 28, the roots 46 of the teeth being welded to the steel margin 38. By applying greater pressure, the crests 44 of the segment teeth may be caused to penetrate further and imbed themselves in the hard facing materials 20, 28, in the manner indicated in FIGURE 15, the crests of the teeth being welded to the hard facing materials.

After the welding operation, the flashed material 48 (FIGURE 13) is removed.

Finished abrasive cutting blades fabricated according to the present invention are shown in FIGURES 14 and 15. In the blade of FIGURE 14, the crests 44 of the projections 42 contact the peripheral edges of the hard facing materials 20, 28. In the blade of FIGURE 15, the tooth crests 44 are imbedded in and welded to the hard facing materials 20, 28.

A flash welding process may be utilized wherein an abrasive cutting segment and the core rim portion 38 are brought together lightly with electrical current flowing through them, then are separated slightly to effect a flashing action between the segment projections and the core rim. The flashing action produces considerable welding heat in addition to the heat produced at the junctures of the segment projections with the core rim portion. Heavy pressure is rapidly applied when the segment and the margin are separated, to force the molten metal of the rim portion to flow into the spaces between the tooth roots 46 and the margin itself.

FIGURE 16 illustrates a form of finished cutting blade wherein a plurality of wear-resistant bodies or spots 48 of facing material are provided on the core sides. The bodies or spots 48 are welded in circular recesses in the blade core, by substantially the same method as that hereinbefore described. The cutting segments are welded to the core rim portion 38 in the manner hereinbefore described, the crests 44 of the teeth 42 penetrating the rim portion 38 to contact the wear resistant spots 48, as shown. Preferably, the spots 48 and the slots 24, 36 are so positioned that certain spots are divided by slots to provide wear resistant areas at the slot edges, as indicated at 50 in FIGURE 16.

In FIGURE 17 is shown a modified form of finished abrasive cutting blade which utilizes abrasive cutting segments 52 which have no projections. The segments are welded to the core rim portion 38 by the spot welding process of electrical resistance welding. Electrical current is passed through the core rim and each segment, while pressure is applied therebetween. The inner side of the segment fuses to the core rim 38, and part of the rim material flashes laterally outward, thereby reducing the thickness of the core rim portion 38, as indicated in FIGURE 17. Although cutting segments without projections and spot welding may be used, they involve certain difficulties not presented by the production welding process. Heat produced by electrical resistance cannot be well concentrated at particular points to effect localized fusion and penetration. Relatively smooth margin surfaces and segment surfaces must be provided, because heat tends to concentrate at unpredictable points along the core rim because of irregularities in the surfaces of the segment and the core rim.

FIGURES 18, 19 and 20 illustrate a modified method of fabricating cutting blades according to the invention. Projections or teeth 54 are cut in the core rim portion. Each projection has a root 56 at the periphery of the wear resistant materials 20, 28, and a crest 58. Projection resistance welding is preferably utilized to weld the teeth 54 to a type of abrasive cutting segment 60 which has no projections. Electrical current is passed through the segment and the teeth 54 while pressure is applied therebetween, as indicated by the arrow in FIGURE 19. The steel of the teeth and the inner side of the segment fuse. The steel of the teeth flows into the spaces between the teeth and the segment, while the segment moves inward toward the hard facing material. The finished cutting blade, shown in FIGURE 20, has a relatively thin section 62 of rim material between the cutting segment and the wear resistant materials 20, 28.

From the foregoing description, those versed in the art will appreciate that the present invention achieves the objects and realizes the advantages hereinbefore mentioned.

Although specific embodiments of the present invention have been illustrated and described herein, it will be understood that the same are merely exemplary of presently preferred embodiments capable of attaining the objects and advantages hereinbefore mentioned, and that the invention is not limited thereto; many variations will be readily apparent to those versed in the art and the invention is to be given its broadest possible interpretation within the terms of the appended claims.

The inventors claim:

1. A method of fabricating a cutting blade comprising providing a blade core blank having a peripheral rim portion of weldable material, providing bodies of wear resistant material at the sides of the core blank inwardly of the rim portion, positioning abrasive cutting means adjacent to the rim portion, and welding the abrasive cutting means to the rim portion, whereby an abrasive cutting blade is formed with abrasive cutting means welded at its periphery.

2. A method of fabricating a cutting blade comprising providing a blade core blank having a peripheral rim portion of weldable material, providing bodies of wear resistant material at the sides of the core blank inwardly of the rim portion, positioning abrasive cutting means adjacent to the core rim portion, and passing electrical current through the rim portion and through the cutting means to weld the cutting means to the rim portion by electrical resistance welding, whereby an abrasive cutting blade is formed with wear resistant bodies at its sides and with abrasive cutting means welded at its periphery.

3. A method of fabricating an abrasive cutting blade comprising providing a core blank having substantially plane sides, cutting a groove in each of the core sides and spaced from the core edge to define a peripheral rim portion, securing a body of wear resistant material in each of said grooves, and welding abrasive cutting means to said rim portion by electrical resistance welding, whereby an abrasive cutting blade is formed with abrasive cutting means welded at its periphery.

4. A method of fabricating an abrasive cutting blade comprising providing a core blank having substantially plane sides and an edge, cutting a groove in each of the sides and spaced from the edge to define a peripheral rim portion, welding a body of wear-resistant metal alloy in each of the grooves, removing excess wear resistant material to define plane wear resistant surfaces at the core sides, and welding abrasive cutting means to the core rim portion, whereby an abrasive cutting blade is formed with wear-resistant sides and with abrasive cutting means fused to its peripheral rim portion.

5. A method of fabricating an abrasive cutting blade comprising providing a core blank having substantially plane sides and an edge, cutting a groove in each of the sides and spaced from the edge to define a peripheral rim portion, welding a body of wear-resistant metal alloy in each of the grooves, positioning abrasive cutting elements adjacent to the core rim portion, and passing electrical current through the rim portion and the abrasive cutting elements to weld the cutting elements to the rim portion by electrical resistance welding, whereby an abrasive cutting blade is formed with wear-resistant sides and with abrasive cutting means welded at its periphery.

6. A method of fabricating an abrasive cutting blade comprising providing a core blank having sides and a peripheral rim portion, providing bodies of wear resistant material at the sides of the core blank inwardly of the rim portion, providing a plurality of abrasive cutting elements having projections defined on their inner sides, positioning the abrasive cutting elements adjacent to the core rim portion, and passing electrical current through the core rim portion and the cutting elements, while applying pressure urging the cutting elements and the core rim portion together, whereby material of the core rim portion fuses and the cutting element projections penetrate the rim portion, while core rim material fills the spaces between the cutting element projections.

7. A method of fabricating an abrasive cutting blade comprising providing a core blank having sides and an edge, cutting a groove in each of the core sides and spaced from the edge to define a peripheral rim portion, welding a body of wear resistant material in each of the grooves, providing a plurality of abrasive cutting elements having projections defined on their inner sides, positioning the abrasive cutting elements adjacent to the core rim portion, and passing electrical current through the core rim portion and the cutting elements, while applying pressure urging the cutting elements and the core rim portion together, whereby material of the core rim portion fuses and the cutting element projections penetrate the rim portion, while core rim material fills the spaces between the cutting element projections.

8. A method of fabricating an abrasive cutting blade comprising providing a core blank having sides and a peripheral rim portion, providing bodies of wear resistant material at the sides of the core blank inwardly of the rim portion, cutting a plurality of slots spaced along and extending inwardly from said core edge, providing a plurality of abrasive cutting elements having projections defined on their inner sides, positioning the cutting elements adjacent to the core rim portion and between the respective slots, and passing electrical current through the core rim portion and the cutting elements, while applying pressure urging the cutting elements and the core rim portion together, whereby material of the core rim portion fuses and the cutting element projections penetrate the rim portion while core rim material fills the spaces between the cutting element projections.

9. A method of fabricating an abrasive cutting blade comprising providing a core blank having sides and a peripheral rim portion, providing bodies of wear resistant material at the sides of the core blank inwardly of the rim portion, providing a plurality of abrasive cutting elements having projections defined on their inner sides, positioning the abrasive cutting elements adjacent to the core rim portion, passing electrical current through the core rim portion and the cutting elements, and applying predetermined pressure urging the cutting elements and the core rim portion together, whereby material of the core rim portion fuses and the cutting element projections penetrate the core rim portion and become imbedded in the bodies of hard facing material, while core rim material fills the spaces between the cutting element projections.

10. A method of fabricating an abrasive cutting blade comprising providing a core blank having sides and a peripheral rim portion, providing bodies of wear resistant material at the sides of the core blank inwardly of the rim portion, defining peripheral projections in the core rim portion, providing a plurality of abrasive cutting elements, positioning the abrasive cutting elements adjacent to the core rim portion projections, passing electrical current through the cutting elements and the core rim portion projections, and applying pressure urging the cutting elements and the core rim portion together, whereby material of the rim portion projections fuses and the projections are reduced to a relatively thin layer of rim portion material which is welded to the abrasive cutting elements.

11. A method of fabricating an abrasive cutting blade comprising providing a core blank having sides and an edge, cutting a groove in each of the core sides and spaced from the edge to define a peripheral rim portion, welding a body of wear resistant material in each of the grooves, defining peripheral projections in the core rim portion, providing a plurality of abrasive cutting elements, positioning the abrasive cutting elements adjacent to the core rim portion projections, passing electrical current through the cutting elements and the core rim portion projections, and applying pressure urging the cutting elements and the core rim portion together, whereby material of the rim portion projections fuses and the projections are reduced to a relatively thin layer of rim portion material which is welded to the abrasive cutting elements.

12. A method of fabricating an abrasive cutting blade, comprising providing a steel core blank having first and second sides and a peripheral edge, cutting a groove in each of the core sides, thereby defining a rim portion, welding a first wear resistant material in the groove in the first side, cooling the core slowly to prevent cracking of said first wear resistant material, welding a second wear resistant material in the groove in the second side, said second wear resistant material having a lower melting point than the first material and being weldable without fusion of the first wear resistant material, cooling the core slowly to prevent cracking of the second wear resistant material, providing a plurality of abrasive cutting elements, positioning the abrasive cutting elements adjacent to said core rim portion, and passing electrical current through the core rim portion and the cutting elements to fuse the cutting elements to the rim portion by electrical resistance welding, whereby an abrasive cutting blade is formed with wear resistant sides and with abrasive cutting elements welded at its periphery.

13. A method of fabricating an abrasive cutting blade comprising providing a circular core blank having first and second sides and a circumferential edge, cutting a first annular groove in the first side and spaced from the edge, welding a first body of wear resistant material in the first groove, cooling the core slowly to prevent cracking of the first material, cutting a second annular groove in the second side surface and spaced from the edge, welding a second body of wear resistant material in the second groove, a peripheral core rim portion being defined by the grooves and retaining the first and second bodies of material while they are fused during welding, cooling the core relatively slowly to prevent cracking of the second wear resistant material, providing a plurality of abrasive cutting elements having projections defined on their inner sides, positioning the abrasive cutting elements adjacent to the core rim portion, and passing electrical current through the core rim portion and the cutting elements, while applying pressure urging the cutting elements and the core rim portion together, whereby material of the core rim portion fuses and the cutting element projections penetrate the rim portion, while core rim material fills the spaces between the cutting element projections.

14. A method of fabricating an abrasive cutting blade comprising providing a circular core blank having first and second sides and a circumferential edge, cutting a first annular grooves in the first side and spaced from the edge, welding a first body of wear resistant material in the first groove, cooling the core relatively slowly to prevent cracking of the first material, cutting a first series of radial slots spaced along said circumferential edge and extending inwardly therefrom, cutting a second annular groove in the second side surface and spaced from the edge, welding a second body of wear resistant material in the second groove, a peripheral core rim portion being defined by the grooves and retaining the first and second bodies of material while they are fused during welding, cooling the core slowly to prevent cracking of the second wear resistant material, cutting a second series of radial slots spaced on said circumferential edge and extending inwardly therefrom, providing a plurality of abrasive cutting elements having projections defined on their inner sides, positioning the abrasive cutting elements adjacent to the core rim portion, and passing electrical current through the core rim portion and the cutting elements while applying pressure urging the cutting elements and the core rim portion together, whereby material of the core rim portion fuses and the cutting element projections penetrate the rim portion, while core rim material fills the spaces between the cutting element projections.

15. An abrasive cutting blade comprising a steel core having sides, a peripheral rim portion on the core, a reduced portion of the core defining a depression in each of the sides inwardly from the rim portion, a body of wear resistant metal alloy welded in each of said depressions and cooperating with the respective core sides to define wear resistant side surfaces, said core defining a plurality of slots spaced along and extending inwardly from the core periphery, and a plurality of abrasive cutting elements welded to the core rim portion, each of said abrasive cutting elements being disposed between a pair of adjacent slots, and each of the abrasive cutting elements having projections welded to an imbedded in said core rim portion.

References Cited in the file of this patent

UNITED STATES PATENTS

| | | |
|---|---|---|
| 2,763,258 | Hughes | Sept. 18, 1956 |
| 2,798,474 | Balhausen | July 9, 1957 |